(12) United States Patent
Liu et al.

(10) Patent No.: US 11,994,940 B2
(45) Date of Patent: May 28, 2024

(54) FAULT PROCESSING METHOD, RELATED DEVICE, AND COMPUTER STORAGE MEDIUM

(71) Applicant: Huawei Cloud Computing Technologies Co., Ltd., Shenzhen (CN)

(72) Inventors: Wei Liu, Shenzhen (CN); Feiyang Gu, Dongguan (CN); Shen Wang, Shenzhen (CN); Mohua Li, Beijing (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 155 days.

(21) Appl. No.: 17/384,361

(22) Filed: Jul. 23, 2021

(65) Prior Publication Data
US 2021/0349777 A1    Nov. 11, 2021

Related U.S. Application Data

(63) Continuation of application No. PCT/CN2020/073612, filed on Jan. 21, 2020.

(30) Foreign Application Priority Data

Jan. 25, 2019  (CN) .......................... 201910074067.2

(51) Int. Cl.
*G06F 11/00* (2006.01)
*G06F 11/07* (2006.01)
*G06F 13/24* (2006.01)
*G06F 13/42* (2006.01)

(52) U.S. Cl.
CPC ...... *G06F 11/0793* (2013.01); *G06F 11/0706* (2013.01); *G06F 11/0751* (2013.01);
(Continued)

(58) Field of Classification Search
CPC ............. G06F 11/0703; G06F 11/0706; G06F 11/0712; G06F 11/0745; G06F 11/0751;
(Continued)

(56) References Cited

U.S. PATENT DOCUMENTS 8,510,592 B1 * 8/2013 Chan .................... G06F 11/0745
714/5.1
8,725,919 B1 * 5/2014 Zhu ....................... G06F 13/102
710/313
(Continued)

FOREIGN PATENT DOCUMENTS

CA          2844707 C      12/2016
CN       101557379 A      10/2009
(Continued)

OTHER PUBLICATIONS

Zhang, Yanmin, and T. Long Nguyen. "Enable pci express advanced error reporting in the kernel." In Linux Symposium, p. 297. 2007. (Year: 2007).*
(Continued)

*Primary Examiner* — Joseph D Manoskey
(74) *Attorney, Agent, or Firm* — Leydig, Voit & Mayer, Ltd.

(57) ABSTRACT

A fault processing method includes: a fault processing apparatus receives first hardware fault information generated by a first PCIe device on a first PCIe link. The first hardware fault information includes a device identifier of the first PCIe device and is used to indicate that a hardware fault occurs on the first PCIe device. Further, the fault processing apparatus performs, based on the first hardware fault information, fault recovery on the first PCIe link on which the first PCIe device is located, and interrupts a software service related to the first PCIe device.

22 Claims, 4 Drawing Sheets

(52) U.S. Cl.
CPC .......... *G06F 13/24* (2013.01); *G06F 13/4282* (2013.01); *G06F 2213/0026* (2013.01)

(58) Field of Classification Search
CPC .............. G06F 11/0754; G06F 11/0757; G06F 11/0772; G06F 11/0793; G06F 13/20; G06F 13/24; G06F 13/38; G06F 13/42; G06F 13/4282; G06F 2213/0026
See application file for complete search history.

(56) References Cited

U.S. PATENT DOCUMENTS

| | | | |
|---|---|---|---|
| 9,710,341 B2 | 7/2017 | Butcher et al. | |
| 2013/0332922 A1* | 12/2013 | Entezari | G06F 9/45558 718/1 |
| 2015/0082080 A1* | 3/2015 | Lin | G06F 11/3041 714/48 |
| 2015/0347225 A1* | 12/2015 | Pawlowski | G06F 3/0656 711/163 |
| 2018/0089047 A1 | 3/2018 | Cooper et al. | |

FOREIGN PATENT DOCUMENTS

| | | |
|---|---|---|
| CN | 103124225 A | 5/2013 |
| CN | 103384204 A | 11/2013 |
| CN | 103440188 A | 12/2013 |
| CN | 103534982 A | 1/2014 |
| CN | 106502944 A | 3/2017 |
| CN | 106502952 A | 3/2017 |
| CN | 106844078 A | 6/2017 |
| CN | 106878048 A | 6/2017 |
| CN | 108733500 A | 11/2018 |
| CN | 109189602 A | 1/2019 |
| CN | 109815043 A | 5/2019 |
| IN | 104170322 A | 11/2014 |

OTHER PUBLICATIONS

M. Daga, A. M. Aji and W. - c. Feng, "On the Efficacy of a Fused CPU+GPU Processor (or APU) for Parallel Computing," 2011 Symposium on Application Accelerators in High-Performance Computing, Knoxville, TN, USA, 2011, pp. 141-149, doi: 10.1109/SAAHPC.2011.29. (Year: 2011).*

"PCI Code and ID Assignment Specification Revision 1.11", Jan. 24, 2019, https://uefi.org/PCI%20Code%20and%20ID%20Assignment%20Spec_rev1.11 (Year: 2019).*

Zhang et al., "Enable PCI Express Advanced Error Reporting in the Kernel," Proceedings of the Linux Symposium, XP055278576, total 10 pages, Ottawa, Ontario Canada (Jun. 27-30, 2007).

* cited by examiner

FAULT PROCESSING METHOD, RELATED DEVICE, AND COMPUTER STORAGE MEDIUM

CROSS-REFERENCE TO RELATED APPLICATIONS

This application is a continuation of International Application No. PCT/CN2020/073612, filed on Jan. 21, 2020, which claims priority to Chinese Patent Application No. 201910074067.2, filed on Jan. 25, 2019, the disclosure of which is hereby incorporated by reference in its entirety.

TECHNICAL FIELD

The present invention relates to the field of computer technologies, and in particular, to a fault processing method, a related device, and a computer storage medium.

BACKGROUND

With continuous development of computer technologies, both hardware and software of a computer (also referred to as a computing device) are rapidly improved. Many peripheral devices of the computing device are high-speed serial computer expansion bus standard (peripheral component interconnect express, PCIe) devices. As a quantity of peripheral devices increases, a probability that a PCIe device is faulty increases.

Currently, when a PCIe device is faulty, a computing device implements fault recovery on the PCIe device by directly resetting an entire PCIe bus system. Consequently, normal service communication of the computing device is affected, and a software service is interrupted.

SUMMARY

Embodiments of the present invention provide a fault processing method, a related device, and a computer storage medium, to resolve a prior-art problem such as service interruption caused by direct resetting, thereby improving fault processing reliability.

According to a first aspect, an embodiment of the present invention provides a fault processing method. The method includes: A fault processing apparatus receives first hardware fault information generated by a first PCIe device on a first PCIe link. The first hardware fault information is used to indicate that a hardware fault occurs on the first PCIe device, and the first hardware fault information includes a device identifier of the first PCIe device. The fault processing apparatus may perform, based on the first hardware fault information, fault recovery on the first PCIe link on which the first PCIe device is located, and interrupt a software service related to the first PCIe device.

According to this embodiment of the present invention, service interruption, a problem that normal device service communication is affected, and the like in an existing system resetting solution can be resolved, thereby ensuring device service communication reliability.

In a possible implementation of the first aspect, when interrupting the software service related to the first PCIe device, the fault processing apparatus skips interrupting a software service related to a second PCIe device. The second PCIe device is located on a second PCIe link that is in a PCIe bus system and that is different from the first PCIe link. In other words, the second PCIe device is any one or more PCIe devices that are in the PCIe bus system and that are different from the first PCIe device.

By performing this implementation step, the fault processing apparatus interrupts only the software service related to the first PCIe device on which the hardware fault occurs, and does not interrupt a software service related to another PCIe device that runs normally, thereby effectively ensuring high service communication reliability.

In another possible implementation of the first aspect, after the fault processing apparatus interrupts the software service related to the first PCIe device, the fault processing apparatus may receive hardware fault recovery success information that is sent by a root complex and that carries the device identifier of the first PCIe device. Further, the fault processing apparatus may recover the software service related to the first PCIe device based on the fault recovery success information.

By performing this implementation step, after the fault recovery succeeds, the fault processing apparatus can recover or rerun the software service related to the first PCIe device, so as to recover normal service apparatus communication.

In another possible implementation of the first aspect, before the fault processing apparatus performs fault recovery on the first PCIe device based on the first hardware fault information, the fault processing apparatus may determine, based on the device identifier of the first PCIe device that is carried in the first hardware fault information, that the first PCIe device is a parallel processor. The parallel processor is a device having a computing capability or a data processing capability, for example, a graphics processing unit (GPU) or a field programmable gate array (FPGA).

In another possible implementation of the first aspect, when the fault processing apparatus determines that the first PCIe device is a parallel processor, the fault processing apparatus may determine, based on the device identifier of the first PCIe device, at least one virtual machine that uses the first PCIe device, and indicate that the at least one virtual machine that uses the first PCIe device is to stop using a data processing service related to the first PCIe device. For example, if the first PCIe device is a GPU, the fault processing apparatus determines at least one virtual machine that uses the GPU, and indicates that each virtual machine is to stop using an image processing service related to the GPU. The fault processing apparatus may indicate, in a form of sending a first notification message to a virtual machine, that the virtual machine is to stop running the data processing service related to the first PCIe device.

By performing this implementation step, the fault processing apparatus may interrupt a software service related to a PCIe device based on a classification of the PCIe device. For example, when the PCIe device is a parallel processor, the software service related to the PCIe device is a data processing service.

In another possible implementation of the first aspect, the fault processing apparatus may determine, based on the device identifier of the first PCIe device that is carried in the fault recovery success information, at least one virtual machine that uses the first PCIe device, and indicate that the at least one virtual machine that uses the first PCIe device is to restart to recover the data processing service related to the first PCIe device. The fault processing apparatus may indicate, in a form of sending a second notification message, that each virtual machine is to restart to recover the data processing service related to the first PCIe device.

By performing this implementation step, the fault processing apparatus may recover a software service related to a PCIe device based on a classification of the PCIe device. For example, when the PCIe device is a parallel processor, the software service related to the PCIe device is a data processing service. This ensures normal running and processing of the data processing service. In another possible implementation of the first aspect, before the fault processing apparatus receives the first hardware fault information, the fault processing apparatus may further record status information stored in a register of each PCIe device on the first PCIe link. The status information is used to indicate information generated when the PCIe device runs, for example, information indicating whether running is normal and data generated during running. Correspondingly, when the fault processing apparatus recovers the first PCIe link, the fault processing apparatus may reset a downstream port of each PCIe device on the first PCIe link, so that the register corresponding to each PCIe device on the first PCIe link is recovered to an initial state. For example, the status information stored in the register is cleared to zero. Further, after resetting, the fault processing apparatus may rewrite the status information recorded before the first PCIe device is faulty into the register, so as to ensure that each PCIe device on the first PCIe link remains in, after resetting, a state generated before the hardware fault occurs on the first PCIe device. Optionally, after determining that the hardware fault occurs on the first PCIe device (or after receiving the first hardware fault information), the fault processing apparatus may disable a fault reporting function of each PCIe device on the first PCIe link, to stop generating a hardware fault interrupt signal. The hardware fault interrupt signal is used to generate the first hardware fault information. Optionally, after the fault processing apparatus recovers the first PCIe link, the fault processing apparatus may enable the fault reporting function of each PCIe device on the first PCIe link, to subsequently report a corresponding hardware fault interrupt signal when any PCIe device is faulty.

By performing this implementation step, the fault processing apparatus may perform, based on a classification of a PCIe device, fault recovery on the PCIe device and a PCIe link on which the PCIe device is located, so as to implement normal service communication and running. In another possible implementation of the first aspect, the fault processing apparatus may determine, based on the device identifier of the first PCIe device that is carried in the first hardware fault information, that the first PCIe device is a network adapter. The network adapter is a device having a data forwarding function and a data transmission function, for example, a PCI network adapter. In another possible implementation of the first aspect, the fault processing apparatus may determine, based on the device identifier of the first PCIe device, at least one virtual machine that uses the first PCIe device, and indicate that the at least one virtual machine that uses the first PCIe device is to stop using a data exchange service related to the first PCIe device. For example, if the first PCIe device is a PCI network adapter, the fault processing apparatus may indicate that each virtual machine that uses the PCI network adapter is to stop using the PCI network adapter to perform data transmission. The fault processing apparatus may indicate, in a form of a third notification message, that each virtual machine is to stop running the data exchange service related to the first PCIe device.

By performing this implementation step, the fault processing apparatus may interrupt a software service related to a PCIe device based on a classification of the PCIe device. For example, when the PCIe device is a network adapter, the software service related to the PCIe device is a data exchange service.

In another possible implementation of the first aspect, after receiving the fault recovery success information, the fault processing apparatus may determine, based on the device identifier of the first PCIe device that is carried in the fault recovery success information, at least one virtual machine that uses the first PCIe device, and indicate that the at least one virtual machine that uses the first PCIe device is to restart to recover the data exchange service related to the first PCIe device. The fault processing apparatus may indicate, in a form of a fourth notification message, that each virtual machine is to rerun the data exchange service related to the first PCIe device.

By performing this implementation step, the fault processing apparatus may recover a software service related to a PCIe device based on a classification of the PCIe device. For example, when the PCIe device is a network adapter, the software service related to the PCIe device is a data exchange service. This ensures normal running and processing of the data exchange service.

In another possible implementation of the first aspect, when performing fault recovery on the first PCIe link, the fault processing apparatus may control the root complex to stop communicating with the first PCIe device, for example, stop sending a heartbeat signal to the first PCIe device. Further, the fault processing apparatus controls the root complex to perform link negotiation with the first PCIe device, and when the link negotiation succeeds, the fault processing apparatus controls the root complex to communicate with the first PCIe device, for example, controls the root complex to send a heartbeat signal to the first PCIe device. Optionally, when receiving the first hardware fault information, the fault processing apparatus may disable a fault reporting function of each PCIe device on the first PCIe link, to stop generating a hardware fault interrupt signal. The hardware fault interrupt signal is used to generate the first hardware fault information. Optionally, after fault recovery, the fault processing apparatus may re-enable the fault reporting function of each PCIe device on the first PCIe link.

By performing this implementation step, the fault processing apparatus may perform, based on a classification of a PCIe device, fault recovery on the PCIe device and a PCIe link on which the PCIe device is located, so as to implement normal service communication and running.

In another possible implementation of the first aspect, the fault processing apparatus may further receive hardware fault recovery failure information that is sent by the root complex and that carries the device identifier of the first PCIe device. Further, the fault processing apparatus may reset, based on the hardware fault recovery failure information, each PCIe device in the PCIe bus system in which the first PCIe device is located, to implement fault recovery on the first PCIe link.

By performing this implementation step, after determining that recovery on a PCIe link fails, the fault processing apparatus further implements fault recovery on the PCIe link through system resetting, to ensure normal service running and communication, thereby ensuring service communication reliability.

In another possible implementation of the first aspect, after receiving the first hardware fault information, the fault processing apparatus may send fifth notification information to a cloud management platform. The fifth notification information is used to indicate that the cloud management platform is to stop managing at least one related virtual machine that uses the first PCIe device.

In another possible implementation of the first aspect, after the fault recovery on the first PCIe link succeeds, the fault processing apparatus may send sixth notification information to the cloud management platform. The sixth notification information is used to indicate that the cloud management platform is to recover management on the at least one related virtual machine that uses the first PCIe device. Optionally, after the fault recovery on the first PCIe link fails, the fault processing apparatus may send seventh notification information to the cloud management platform. The seventh notification information is the same as the first notification information, and carries the device identifier of the first PCIe device, a device identifier of the at least one virtual machine that uses the first PCIe device, or the like. The seventh notification information is used to indicate that the cloud management platform is to stop managing the at least one related virtual machine that uses the first PCIe device, for example, stop performing operation and maintenance on a virtual machine or stop creating a new virtual machine related to the first PCIe device.

By performing this step, the fault processing apparatus may manage a virtual machine related to a PCIe device through the cloud management platform, for example, stop/restart operation and maintenance on the virtual machine, thereby improving virtual machine management reliability.

According to a second aspect, an embodiment of the present invention provides a fault processing apparatus. The apparatus includes a function module or unit configured to perform the method according to the first aspect or any possible implementation of the first aspect.

A technical effect brought by the second aspect or any possible implementation of the second aspect is similar to that of the first aspect or any possible implementation of the first aspect. Details are not described again.

According to a third aspect, an embodiment of the present invention provides a fault processing apparatus, including a processor, a memory, a communications interface, and a bus. The processor, the communications interface, and the memory communicate with each other through the bus. The communications interface is configured to receive and send data. The memory is configured to store an instruction. The processor is configured to invoke the instruction in the memory to perform the method according to the first aspect or any possible implementation of the first aspect.

According to a fourth aspect, a non-transitory computer storage medium is provided. The non-transitory computer storage medium stores program code used for fault processing. The program code includes an instruction used to perform the method according to the first aspect or any possible implementation of the first aspect.

According to a fifth aspect, a chip product is provided, to perform the method according to the first aspect or any possible implementation of the first aspect.

In the present invention, based on the implementations provided in the foregoing aspects, the implementations may be further combined to provide more implementations.

BRIEF DESCRIPTION OF DRAWINGS

To describe technical solutions in embodiments of the present invention or in the existing technology more clearly, the following briefly describes the accompanying drawings.

DESCRIPTION OF EMBODIMENTS

The following describes embodiments of the present invention with reference to the accompanying drawings.

Some technical concepts or technical terms in the present invention are first described.

A device identifier of a PCIe device is an identifier used for PCIe device distinguishing or representation in a PCIe bus system. The device identifier may be a bus device function (BDF) identifier.

A fault interrupt signal is an alarm signal that is generated after a computing device detects a hardware or software fault, and is used to indicate that the computing device is faulty. Optionally, the fault interrupt signal may carry information such as a device identifier of the computing device, a fault type of the computing device, and a fault.

During actual application, the fault interrupt signal may include a message signaled interrupt (MSI) signal, a non-maskable interrupt (NMI) signal, a downstream port containment (DPC) interrupt signal, another interrupt signal used to indicate that the computing device is faulty, or the like. This is not limited in the embodiments of the present invention.

Figure 1:
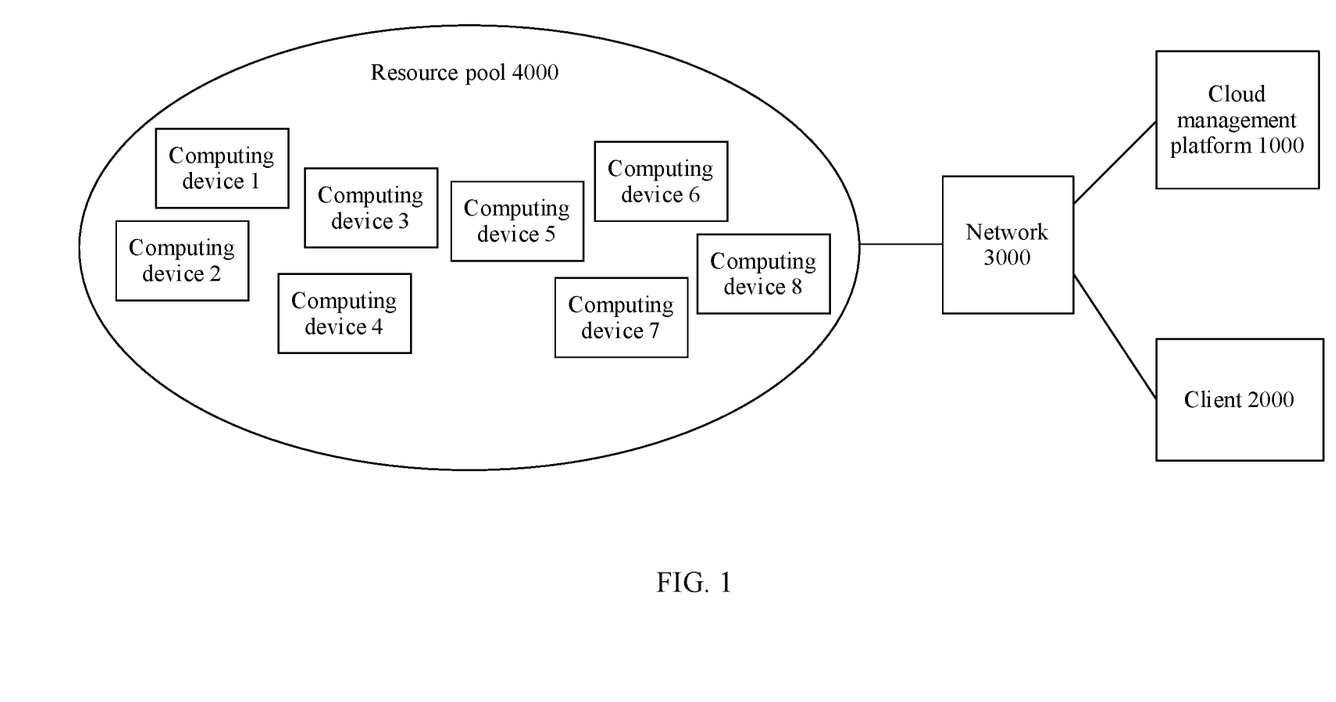
FIG. 1 is a schematic diagram of a framework of a cloud management system according to an embodiment of the present invention.

To resolve service interruption, a problem that normal service communication cannot be provided, and the like in an existing fault processing solution, the present invention provides a fault processing method, and a network framework and a related device to which the method is applicable. FIG. 1 is a schematic diagram of a network framework of a cloud management system according to an embodiment of the present invention. The cloud management system shown in FIG. 1 includes a cloud management platform 1000, a client 2000, and a resource pool 4000. The cloud management platform 1000, the client 2000, and the resource pool 4000 are separately connected to a network 3000 to implement communication through the network 3000.

The resource pool 4000 includes a plurality of computing devices (which may also be referred to as host machines or servers). The cloud management platform 1000 may query available resources of each computing device, such as a computing resource, a network resource, and a storage resource, so as to create a virtual machine that meets a requirement of the client 2000 on the computing device.

Each computing device in the resource pool 4000 is provided with a virtual machine manager. The cloud management platform 1000 may communicate with the virtual machine manager of each computing device, to manage the virtual machine created on the computing device, for example, manage a life cycle of the virtual machine, periodically maintain the virtual machine, and disable or enable a related software service of the virtual machine.

The cloud management platform 1000 may be, for example, Openstack or VMware vCenter, and supports a service application such as infrastructure as a service (IAAS). The client 2000 may be, for example, a personal computer or a tablet computer. In some other examples, the cloud management platform 1000 may alternatively be used as a subsystem deployed in one computing device in the resource pool 4000.

Figure 2:
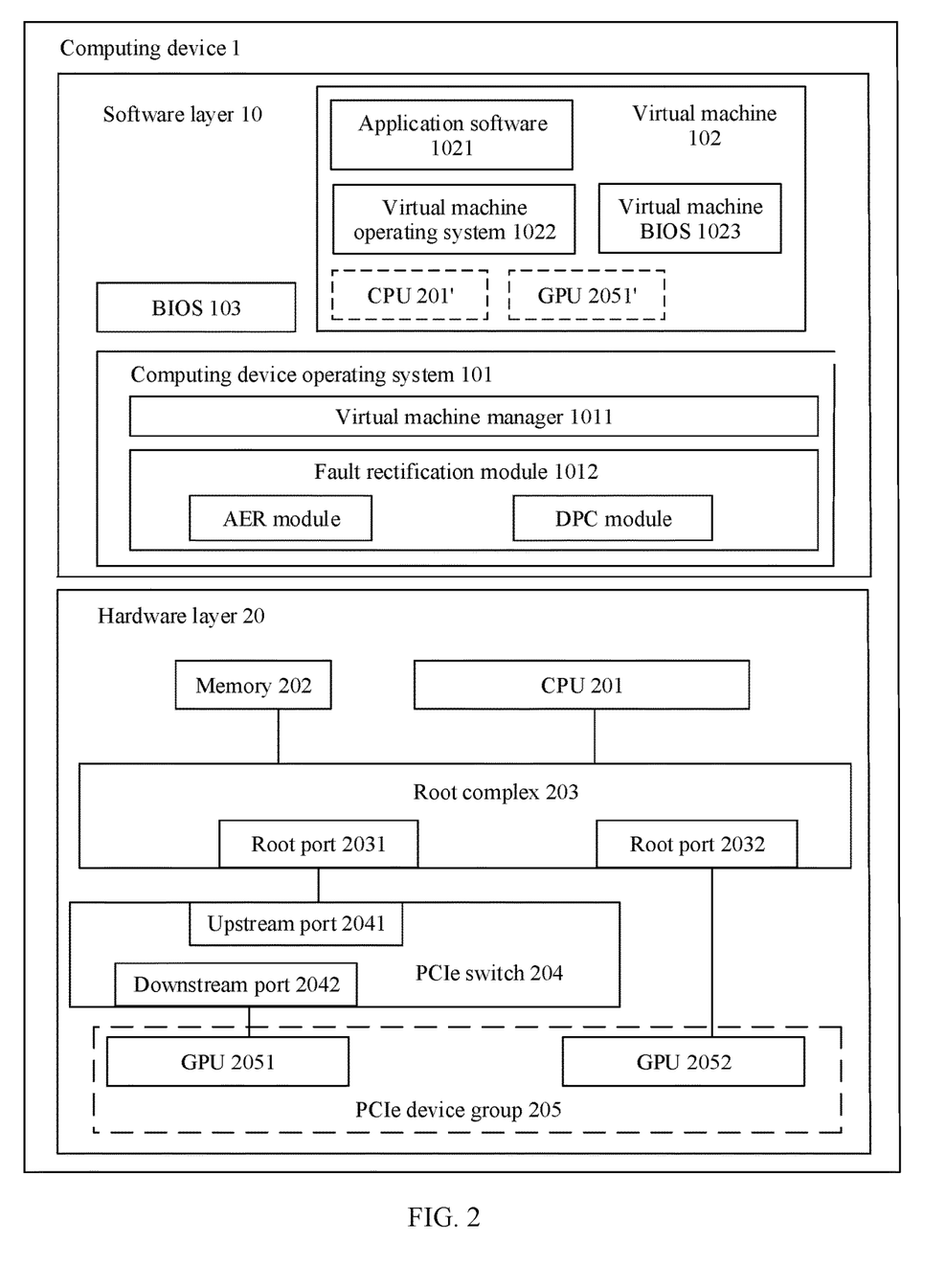
FIG. 2 is a schematic diagram of a framework of a computing device according to an embodiment of the present invention.

FIG. 2 is a schematic structural diagram of a computing device according to an embodiment of the present invention. The computing device may be any computing device in the foregoing resource pool 4000. A computing device 1 is used as an example. The computing device 1 shown in FIG. 2 may include a software layer 10 and a hardware layer 20. The software layer 10 includes an operating system (OS) 101 of the computing device 1 and at least one virtual machine. The figure shows one virtual machine 102 as an example. The software layer 10 may further include a basic input/output system (BIOS) 103. A virtual machine manager (VMM) 1011 and a fault recovery module 1012 are deployed in the operating system 101. The hardware layer 20 includes a CPU 201, a memory 202, a root complex 203, a PCIe switch 204, and a PCIe device group 205. The PCIe device group includes one or more PCIe devices. The figure shows two PCIe devices as an example: a GPU 2051 and a GPU 2052. The GPU 2051 communicates with the PCIe switch 204, and the GPU 2052 directly communicates with the root complex 203.

The virtual machine manager 1011 is configured to implement virtual machine management, for example, create at least one virtual machine on the computing device 1 based on an actual requirement of the cloud management platform, or disable or enable a related software service of a virtual machine based on an actual service requirement. During actual application, the virtual machine manager may be implemented by components such as a VMM, libirt, qemu, and nova.

Optionally, in another embodiment of the present invention, the virtual machine manager may alternatively be implemented by using a hypervisor.

Optionally, the virtual machine manager 1011 may access a PCIe bus system to query related parameters of each device in the PCIe bus system, for example, a device identifier, a hardware specification, and a device physical address. The PCIe bus system may specifically include all the devices at the hardware layer 20 shown in the figure. Each device in the PCIe bus system corresponds to one register. The virtual machine manager 1011 may configure the register of each device in the PCIe bus system, to obtain status information stored in the register. The status information is used to record information generated when the device runs, for example, information indicating whether the device is faulty during current running and data information generated when the device runs. In addition, the virtual machine manager 1011 may further communicate with the cloud management platform 1000, so as to create a corresponding virtual machine on the computing device 1 based on the actual requirement of the cloud management platform, and manage the created virtual machine.

Further, the virtual machine manager 1011 may obtain a topology structure of the PCIe bus system. The topology structure is as follows: The root complex 203 includes a first PCIe link and a second PCIe link, the first PCIe link includes the PCIe switch 204 and the GPU 2051, and the second PCIe link includes the GPU 2052. The virtual machine manager 1011 may obtain a device identifier of each PCIe device in the PCIe bus system. Therefore, based on a device identifier of one PCIe device, a device identifier of another PCIe device in a PCIe link on which the PCIe device is located may be obtained.

The fault recovery module 1012 is configured to perform fault recovery on a PCIe device or a PCIe link on which a hardware fault occurs in the computing device 1. During actual application, the fault recovery module 102 may include an advanced error reporting (AER) module and/or a downstream port containment (DPC) module. When the computing device 1 supports a DPC function, the fault recovery module may include the DPC module and the AER module. On the contrary, when the computing device 1 does not support a DPC function, the fault recovery module may be the AER module. How the fault recovery module implements fault recovery on a PCIe link or a PCIe device is described in detail below in the present invention.

In some examples, the virtual machine manager 1011 and the fault recovery module 1012 may be deployed in the operating system 101 in a form of third-party software, or partially deployed in the operating system 101 and partially deployed outside the operating system 101. This is not limited in this embodiment of the present invention.

Optionally, the fault recovery module 1012 may also be configured in the virtual machine manager 1011. This is not limited in this embodiment of the present invention.

A virtual machine (the virtual machine 102 shown in the figure) may be created after the virtual machine manager 1011 receives a virtual machine creation instruction sent by the cloud management platform 1000. The virtual machine creation instruction carries a resource requirement of a virtual machine that needs to be created. The resource requirement includes a processor, a hard disk, a memory, a network, and the like required by the virtual machine, and further needs to include a device identifier of a PCIe device in the PCIe device group, for example, a device identifier of the GPU 2051 or a device identifier of the GPU 2052 in the figure, so as to allocate the PCIe device to the virtual machine for use. A quantity of virtual machines is not limited. The figure shows only one virtual machine 102 as an example, which does not constitute a limitation. Correspondingly, after creating each virtual machine, the virtual machine manager may further store a correspondence between the virtual machine and a PCIe device deployed in the virtual machine. For example, a correspondence between a device identifier (BDF) of a PCIe device and a virtual machine identifier (VM id) of a virtual machine that uses the PCIe device is established in a table form, so that the virtual machine manager subsequently determines, based on the correspondence, one or more corresponding virtual machines that use the PCIe device. One PCIe device may correspond to one or more virtual machines, and each virtual machine is provided with one or more corresponding PCIe devices. This is not limited in the present invention.

As shown in the figure, the virtual machine 102 includes a GPU 101', a hard disk (not shown in the figure), a memory (not shown in the figure), a network (not shown in the figure), an operating system 1022, and a basic input/output system (BIOS) 1023. The virtual machine manager 1011 may perform virtualization on a PCIe device to obtain a virtualized PCIe device. For example, the GPU 2051 in the figure may be virtualized to obtain a GPU 2051'. In addition, the hard disk, the memory, and the network are also obtained by the virtual machine manager 1011 by performing virtualization on corresponding hardware in the computing device 1, and the operating system 1022 and the BIOS 1023 are obtained by the virtual machine manager 1011 through simulation. This is not limited in the present invention.

The devices at the hardware layer 20 may be connected through a PCIe bus to constitute the PCIe bus system. For example, in the figure, the CPU 201, the memory 202, the root complex 203, the PCIe switch 204, the GPU 2051, and the GPU 2052 are connected through the PCIe bus to constitute the PCIe bus system. A communication link between any two devices at the hardware layer 20 is also referred to as a PCIe link.

The PCIe device group 205 includes at least one PCIe device. The PCIe device is used as a PCIe endpoint (EP) defined in a PCIe protocol, and may include but is not limited to devices such as a field programmable gate array (FPGA), a graphics processing unit (GPU), and a chip (for example, an 1822 chip). The figure shows the GPU 2051 and the GPU 2052 as an example.

Any PCIe device in the PCIe device group may communicate with the root complex 203 through the PCIe switch 204. For example, the GPU 2051 may communicate with the root complex 203 through the PCIe switch 204 in the figure. Optionally, the PCIe device in the PCIe device group may further directly communicate with the root complex 203. For example, the GPU 2052 may directly communicate with the root complex 203 in the figure. Optionally, when there are a plurality of PCIe devices communicating with the PCIe switch, any two PCIe devices in the plurality of PCIe devices may communicate with each other through the PCIe switch 204, which is not shown in the figure.

Further, the root complex 203 is provided with a root port (RP) 2031 and a root port 2032, and the PCIe switch 204 is provided with an upstream port 2041 and a downstream port 2042. The root port 2031 is connected to the upstream port 2041, the downstream port 2042 is connected to the GPU 2051, and the root port 2032 is connected to the GPU 2052.

Figure 3:
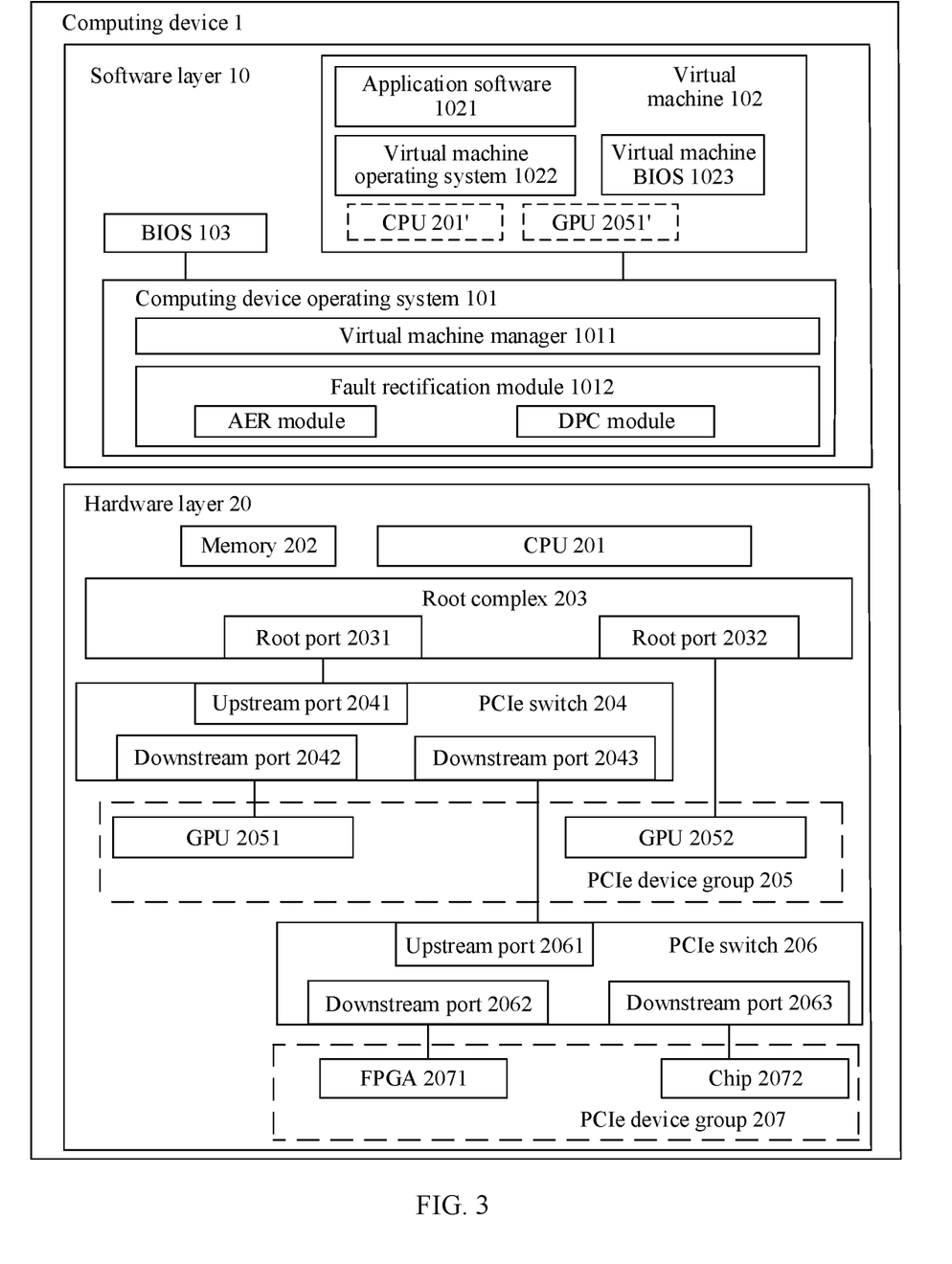
FIG. 3 is a schematic diagram of a framework of another computing device according to an embodiment of the present invention.

In the present invention, a quantity of PCIe switches is not limited. The figure shows one PCIe switch 204 as an example. The PCIe switch 204 is connected to one PCIe device group 205. Optionally, FIG. 3 is a schematic structural diagram of another computing device. As shown in FIG. 3, two PCIe switches are used as an example. The PCIe switch 204 is further provided with a downstream port 2043. The PCIe switch 204 communicates with the PCIe switch 206 through the downstream port 2043, and the PCIe switch 206 may also be connected to a PCIe device group 207. As shown in the figure, the root complex 204 includes four PCIe links. The first PCIe link includes the PCIe switch 204 and the GPU 2051, the second PCIe link includes the GPU 2052, the third PCIe link includes the PCIe switch 204, the switch 206, and a GPU 2071, and the fourth PCIe link includes the PCIe switch 204, the switch 206, and a GPU 2072. An example in which the PCIe device group 207 includes the FPGA 2071 and the chip 2072 is used in the figure. For details about the PCIe switch 206 and the PCIe device group 207, refer to the related descriptions in the embodiment in FIG. 2. This is not limited in the present invention.

Figure 4:
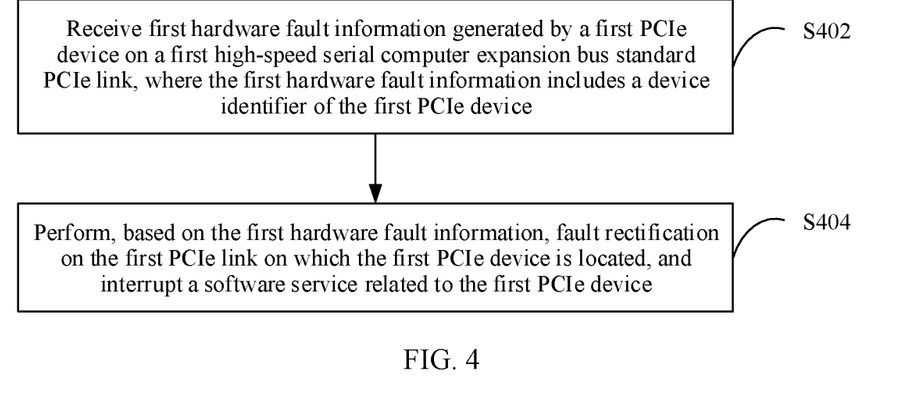
FIG. 4 is a schematic flowchart of a fault processing method according to an embodiment of the present invention.

According to the foregoing embodiments, the following describes a fault processing method in the present invention. FIG. 4 is a schematic flowchart of a fault processing method according to an embodiment of the present invention. The fault processing method shown in FIG. 4 is applied to the computing device shown in FIG. 2 or FIG. 3, and the method includes the following implementation steps.

Step S402: A fault processing apparatus receives first hardware fault information generated by a first PCIe device on a first PCIe link, where the first hardware fault information is used to indicate that a hardware fault occurs on the first PCIe device, and the first hardware fault information includes a device identifier of the first PCIe device.

In the present invention, when detecting that the first PCIe link is faulty, the fault processing apparatus may generate a hardware fault interrupt signal. The hardware fault interrupt signal is used to obtain the first hardware fault information, and the first hardware fault information carries the device identifier of the first PCIe device on which the hardware fault occurs. There are the following several implementations.

In a first implementation, when the fault processing apparatus starts running, each PCIe device that can communicate with the fault processing apparatus may be loaded. When the hardware fault occurs on the first PCIe device, a fault packet may be sent to the fault processing apparatus. The fault packet is used to notify the fault processing apparatus that a PCIe link (or a PCIe device) communicating with the fault processing apparatus is faulty. Correspondingly, after receiving the fault packet, the fault processing apparatus may perform fault detection on each PCIe device on each PCIe link that can communicate with the fault processing apparatus, to obtain the first hardware fault information. The first hardware fault information includes the device identifier of the first PCIe device on which the hardware fault occurs. Optionally, the first hardware fault information may further include fault information such as a fault type of the first PCIe device, a fault, and a communications port of the first PCIe device. Further, the fault processing apparatus may generate the hardware fault interrupt signal. The hardware fault interrupt signal carries the first hardware fault information. Correspondingly, after receiving the hardware fault interrupt signal, the fault processing apparatus may parse the hardware fault interrupt signal to obtain the device identifier of the first PCIe device.

In a second implementation, the fault processing apparatus may detect the faulty first PCIe link and the first PCIe device on the first PCIe link in a heartbeat packet manner. The fault processing apparatus and the first PCIe device communicate with each other through the first PCIe link, and the first PCIe device may periodically send a heartbeat packet to the fault processing apparatus, to maintain mutual communication between the first PCIe device and the fault processing apparatus. Correspondingly, if the fault processing apparatus does not receive, within one period, the heartbeat packet sent by the first PCIe device, the fault processing apparatus may determine that the hardware fault occurs on the first PCIe device. Correspondingly, after determining that the hardware fault occurs on the first PCIe device, the fault processing apparatus may generate the hardware fault interrupt signal. The hardware fault interrupt signal carries the device identifier of the first PCIe device, and is used to indicate that the hardware fault occurs on the first PCIe device. Optionally, after obtaining the hardware fault interrupt signal, the fault processing apparatus may obtain the first hardware fault information through detection. The first hardware fault information includes but is not limited to fault information such as a fault type of the first PCIe device and a fault.

The hardware fault interrupt signal in the present invention is an interrupt signal used to indicate that a hardware fault occurs on a PCIe device, and may include but is not limited to an NMI signal, a DPC interrupt signal, an MSI interrupt signal, another interrupt signal, and the like.

For example, referring to the schematic structural diagram of the computing device shown in FIG. 2, the hardware fault interrupt signal is a DPC interrupt signal, the first PCIe device is the GPU 2051, and the first PCIe link is a communication link between the PCIe switch 204 and the GPU 2051. When the computing device supports a DPC function, and when the fault processing apparatus detects, through the downstream port 2042 of the PCIe switch 204, that the first PCIe link is faulty, when the downstream port 2042 receives a fault packet sent by the GPU 2051 or does not receive, within a preset period, a heartbeat packet sent by the GPU 2051, the fault processing apparatus may generate a DPC hardware fault interrupt signal. The DPC interrupt signal carries the first hardware fault information, and the first hardware fault information is used to indicate the device identifier of the first PCIe device on which the hardware fault occurs, that is, the GPU 2051. Further, the fault processing apparatus may send the DPC interrupt signal to a fault recovery module (which may be the foregoing DPC module) of the fault processing apparatus, so that the DPC module performs fault recovery on the first PCIe link based on the first hardware fault information.

For another example, referring to the schematic structural diagram of the computing device shown in FIG. 2, the hardware fault interrupt signal is an NMI interrupt signal, the first PCIe device is the GPU 2052, and the first PCIe link is a communication link between the root port 2032 and the GPU 2051. When the computing device does not support a DPC function, after a hardware fault occurs on any PCIe device, a fault report message may be sent to the root complex 203. The fault report message carries information such as a fault type of the PCIe device and a device identifier of the PCIe device. For example, if the hardware fault occurs on the first PCIe device, the first PCIe device may send a fault report message to the root complex 203. Correspondingly, after receiving the fault report message, the root complex 203 may write, into a register corresponding to the root complex, information such as the device identifier and the fault type of the first PCIe device that are carried in the message, and generate an SMI interrupt signal to indicate that a hardware fault occurs on a PCIe device communicating with the root complex 203. When detecting, through the root complex 203, that the first PCIe link is faulty, the fault processing apparatus controls the root complex to generate an SMI interrupt signal, and reports the SMI interrupt signal to the BIOS in the computing device. After receiving the SMI interrupt signal, the BIOS in the computing device may perform fault detection on each PCIe device that can communicate with the root complex 203, to obtain the first hardware fault information. The first hardware fault information includes the device identifier of the first PCIe device on which the hardware fault occurs, and optionally, may further include the fault information such as the fault type of the first PCIe device and the fault. After obtaining the SMI interrupt signal, the BIOS in the computing device may invoke a preset function (for example, a ghes_notify_nmi function) to access a generic hardware error source (GHES) data structure, so as to obtain the first hardware fault information. In the GHES data structure, a hardware error that is likely to occur on each PCIe device is defined and recorded.

Further, the BIOS may generate an NMI interrupt signal and send the NMI interrupt signal to a fault recovery module (which may be the foregoing AER module) of the fault processing apparatus. The NMI interrupt signal carries the first hardware fault information. Therefore, the AER module performs fault recovery on the first PCIe link based on the first hardware fault information carried in the NMI interrupt signal.

For another example, referring to the schematic structural diagram of the computing device shown in FIG. 2, the hardware fault interrupt signal is an MSI interrupt signal, the first PCIe device is the GPU 2052, and the first PCIe link is a communication link between the root port 2031 and the GPU 2051. When the computing device does not support a DPC function, the fault processing apparatus detects, through the root complex 203, that the first PCIe link is faulty. In this case, the fault processing apparatus controls the root complex to generate an MSI interrupt signal. The interrupt signal is used to indicate that a hardware fault occurs on a PCIe device that can communicate with the root complex. Correspondingly, after obtaining the MSI interrupt signal, the fault processing apparatus may perform fault detection on each PCIe device that can communicate with the root complex, to obtain the first hardware fault information. The first hardware fault information includes the device identifier of the first PCIe device on which the hardware fault occurs. Optionally, the first hardware fault information may further include information such as a fault type of the first PCIe device and a fault. Optionally, the fault processing apparatus may send the first hardware fault information to a fault recovery module (which may be the foregoing AER module). Therefore, the AER module performs fault recovery on the first PCIe link based on the first hardware fault information.

The fault processing apparatus in the present invention may include program code or function modules such as the fault recovery module (for example, the AER module or the DPC module), the virtual machine manager, and a driver module of a PCIe device in the PCIe device group in the computing device shown in FIG. 2 or FIG. 3. This is not limited in the present invention.

There are two fault types in the present invention: a correctable error (CE) and an uncorrectable error (UCE). The correctable error is an error that can be customized to be identified by hardware and to be automatically corrected or recovered. The uncorrectable error includes a fatal error and a non-fatal error. The non-fatal error is usually directly processed by device driver software, and a PCIe link is recoverable. The fatal fault is usually processed by system software (which may be processed by the fault processing apparatus in the present invention), and usually needs an operation such as resetting, causing a data loss on a PCIe link.

Step S404: The fault processing apparatus performs, based on the first hardware fault information, fault recovery on the first PCIe link on which the first PCIe device is located, and interrupts a software service related to the first PCIe device.

After obtaining the first hardware fault information of the first PCIe device, the fault processing apparatus may perform fault recovery on the first PCIe device or the first PCIe link on which the first PCIe device is located, and interrupt the software service related to the first PCIe device. Optionally, to improve service communication reliability, the fault processing apparatus does not interrupt a software service related to another PCIe device (for example, a second PCIe device) when interrupting the software service related to the first PCIe device, thereby implementing PCIe device service isolation. Therefore, when the first PCIe device is faulty, service running of another PCIe device is not affected, thereby improving service processing efficiency. The second PCIe device is located on a second PCIe link that is in a PCIe bus system and that is different from the first PCIe link. For example, if the first PCIe device is the GPU 2051 shown in FIG. 2, the second PCIe device may be the GPU 2052 in the PCIe bus system at the hardware layer shown in FIG. 2.

Optionally, the fault processing apparatus may determine a type of the first PCIe device based on the device identifier of the first PCIe device that is carried in the first hardware fault information. In the present invention, there may be three types of first PCIe devices based on types of services that need to be processed by the first PCIe devices: a parallel processor, a network adapter, and another PCIe device other than the parallel processor and the network adapter. The parallel processor is a device having a computing capability or a data processing capability, for example, an FPGA or a GPU. The network adapter is a device having a data forwarding (data transmission) function. The another device herein is a device other than the parallel processor and the network adapter, for example, a storage device such as a redundant array of independent disks (RAID).

A implementation in which the fault processing apparatus determines the type of the first PCIe device is not limited in the present invention. For example, in a manner of a preset trustlist, the fault processing apparatus may determine the type of the first PCIe device, in other words, determine that the first PCIe device is any one of a parallel processor, a network adapter, and another device. The fault processing apparatus determines whether the device identifier of the first PCIe device is in the preset trustlist. If the device identifier of the first PCIe device is in the preset trustlist, the fault processing apparatus may obtain the type of the first PCIe device, in other words, may determine that the first PCIe device is a parallel processor or a network adapter. If the device identifier of the first PCIe device is not in the preset trustlist, the fault processing apparatus may determine that the first PCIe device is another device, and the fault processing apparatus may directly reset or restart the computing device in which the first PCIe device is located. The preset trustlist is system-defined, and may include a PCIe device type, a device identifier (device ID) and/or a vendor ID of at least one PCIe device included in the type, and the like.

Optionally, the fault processing apparatus may determine, by using a fault recovery function, that the first PCIe device is a parallel processor or a network adapter. The fault processing apparatus may determine whether the fault recovery function is pre-registered with the first PCIe device. The fault recovery function may be a function pre-registered with a system, and is used to perform fault recovery on the first PCIe device or the first PCIe link on which the first PCIe device is located. For example, the fault recovery function may be used to determine a fault type of a hardware fault that occurs on the first PCIe device or perform fault recovery on a fault. The fault recovery function may include but is not limited to an erro_handler function and the like. If the fault recovery function is pre-registered with the first PCIe device, it may be determined that the first PCIe device is a network adapter. Correspondingly, the fault processing apparatus may perform fault recovery on the first PCIe device or the first PCIe link based on the fault recovery function. Details are described below. On the contrary, if no fault recovery function is registered with the first PCIe device, it is determined that the first PCIe device is a parallel processor, and the fault processing apparatus may perform fault recovery on the first PCIe device or the first PCIe link in another fault recovery manner. Details are also described below.

The following describes an embodiment in which the fault processing apparatus interrupts the software service related to the first PCIe device. The fault processing apparatus may determine, based on the device identifier of the first PCIe device that is carried in the first hardware fault information, the first PCIe device and at least one virtual machine that uses the first PCIe device. During implementation, the fault processing apparatus pre-stores, in the virtual machine manager, a correspondence between the BDF of the first PCIe device and a VM id of the at least one virtual machine that uses the first PCIe device. For details about the correspondence, refer to the related descriptions in the foregoing embodiments. Correspondingly, after receiving the first hardware fault information, the fault processing apparatus may determine, based on the pre-stored correspondence and the device identifier of the first PCIe device that is carried in the information, the VM id of the at least one virtual machine (that is, the at least one virtual machine corresponding to the first PCIe device) that uses the first PCIe device. For example, referring to FIG. 2, if the first PCIe device is the GPU 2051, the fault processing apparatus may determine, based on the pre-stored correspondence and the device identifier of the first PCIe device, that a VM id of a related virtual machine that uses the GPU 2051 is a VM id of the virtual machine 102.

Further, the fault processing apparatus may send a notification message to each of the at least one virtual machine through the virtual machine manager. The notification message is used to indicate that the virtual machine is to stop using the software service related to the first PCIe device. When the first PCIe device is a parallel processor, the fault processing apparatus may send a first notification message to the virtual machine. The first notification message is used to indicate that the virtual machine is to temporarily stop using a data processing service related to the first PCIe device. For example, if the first PCIe device is a GPU, the fault processing apparatus may indicate that the virtual machine is to temporarily stop using the GPU to perform image processing. When the first PCIe device is a network adapter, the fault processing apparatus may send a third notification message to the virtual machine. The third notification message is used to indicate that the virtual machine is to temporarily stop using a data exchange service related to the first PCIe device, for example, indicate that the virtual machine is to temporarily stop using the network adapter to perform data transmission.

The following describes three implementations related to fault recovery.

In a first implementation, the first PCIe device is a parallel processor. Before the fault processing apparatus receives the first hardware fault information generated by the first PCIe device, the fault processing apparatus may record status information stored in a register of each PCIe device on the first PCIe link. Each PCIe device has one or more registers, and the status information stored in the register is used to record related information generated when the PCIe device runs, for example, a running status and service data generated during running. For example, referring to FIG. 2, the first PCIe link is: GPU 2051->PCIe switch 204->root port 2031 of the root complex 203. The GPU 2051 is provided with a register, and the register is configured to store related information generated when the GPU 2051 runs, for example, a device identifier of the GPU 2051, information indicating whether current running is normal, and data generated during running. The PCIe switch 204 is provided with a register, and the register is configured to record a running status of the downstream port 2042, a running status of the upstream port 2041, and information about the PCIe switch 204. For example, the running status of the downstream port 2042 is whether the downstream port 2042 currently performs normal communication, the running status of the upstream port 2041 is whether the upstream port 2041 performs normal communication, and the information about the PCIe switch 204 is a device identifier of the PCIe switch 204. Similarly, the root complex shown in the figure is also provided with a register, and details are not described in the present invention.

Correspondingly, when performing fault recovery, the fault processing apparatus may disable a fault reporting function of each PCIe device on the first PCIe link, to stop generating a hardware fault interrupt signal. For example, if the first PCIe device is the GPU 2051, and the first PCIe link is: GPU 2051->PCIe switch 204->root complex 203, the fault processing apparatus may disable fault reporting functions of the upstream port 2041 of the PCIe switch 204 and the downstream port (root port) 2031 of the root complex 203 in FIG. 2, to stop reporting or generating a hardware fault interrupt signal about the GPU 2051. The fault processing apparatus may perform parameter resetting on the register of the upstream port 2041 and the register of the root port 2031. For example, in the register of the upstream port 2041, "0" is used to indicate that a communication function of the upstream port is enabled, in other words, the upstream port can perform normal data transmission, and "1" is used to indicate that the communication function of the upstream port is disabled, in other words, the upstream port cannot perform normal data transmission. In this case, the fault processing apparatus may set a communication function parameter in the register of the upstream port 2041 to 1, to disable the fault reporting function of the upstream port 2041.

Further, the fault processing apparatus may reset a downstream port of each PCIe device on the first PCIe link, so that the register of each PCIe device is recovered to an initial state. For example, the fault processing apparatus may reset the downstream port 2031 of the PCIe switch 204 and the root port 2031 of the root complex 203, and clear the status information recorded in the register corresponding to the downstream port 2031 and the register of the root port 2031 to zero, to clear the status information recorded in the registers, and recover each register to an initial state. This initial state herein is a default state that is set when a device or an apparatus is delivered from a factory.

Optionally, after resetting the downstream port, the fault processing apparatus may further correspondingly update the register based on the recorded status information stored in the register of each PCIe device on the first PCIe link before the hardware fault occurs on the first PCIe device, so as to rewrite the recorded status information into the register. In this way, each device on the first PCIe link recovers to a running status generated before the hardware fault occurs on the first PCIe device, so that each PCIe device on the first PCIe link subsequently maintains normal service communication, for example, recovers service communication with the first PCIe device. Optionally, after the fault processing apparatus resets the downstream port, the fault processing apparatus may further re-enable the fault reporting function of each PCIe device on the first PCIe link. Therefore, when a hardware fault occurs on any PCIe device on the first PCIe link subsequently, that the hardware fault occurs on the PCIe device on the first PCIe link may be notified in a form of generating and reporting a hardware fault interrupt signal.

In a second implementation, the first PCIe device is a network adapter. When performing fault recovery, the fault processing apparatus may disable a fault reporting function of each PCIe device on the first PCIe link, to stop generating a hardware fault interrupt signal. Further, the fault processing apparatus may control the root complex to stop communicating with the first PCIe device, for example, control the root complex to stop sending a heartbeat signal to the first PCIe device. The fault processing apparatus may further control the root complex to perform link re-negotiation with the first PCIe device, so as to recover communication between the root complex and the first PCIe device when the link negotiation succeeds, for example, control the root complex to send a heartbeat signal to the first PCIe device. For example, referring to FIG. 2, if the first PCIe device is the GPU 2051, the fault processing apparatus may control the root complex 203 to re-negotiate and establish the first PCIe link to the GPU 2051 according to a PCIe communication protocol. Therefore, after the negotiation on the first PCIe link succeeds, the root complex 203 is allowed to send a heartbeat signal to the GPU 2051 through the first PCIe link. Optionally, after the link negotiation succeeds, the fault processing apparatus may re-enable the fault reporting function of each PCIe device on the first PCIe link, to report a hardware fault interrupt signal when any PCIe device on the link is faulty subsequently. For content that is not described in this embodiment of the present invention, refer to the related descriptions in the foregoing first implementation. Details are not described herein again.

In a third implementation, the first PCIe device is another device. The fault processing apparatus may directly reset or restart (panic) a computing device in which the first PCIe device is located, to perform fault recovery on the first PCIe device or the first PCIe link on which the first PCIe device is located.

In an optional embodiment, after the fault processing apparatus completes the fault recovery on the first PCIe link on which the first PCIe device is located (or the first PCIe device), the fault processing apparatus may control the root complex to send a test packet (which is also referred to as a heartbeat packet) to the first PCIe device. If the root complex receives a response packet sent by the first PCIe device, it may be determined that the fault recovery on the first PCIe link succeeds, and corresponding hardware fault recovery success information is generated; otherwise, it is determined that the fault recovery on the first PCIe link fails, and corresponding hardware fault recovery failure information is generated. The hardware fault recovery success information and the hardware fault recovery failure information each carry the device identifier of the first PCIe device.

Optionally, after receiving the hardware fault recovery success information, the fault processing apparatus may determine that the fault recovery on the first PCIe link succeeds. The hardware fault recovery success information carries the device identifier of the first PCIe device. Further, the fault processing apparatus may re-enable the software service related to the first PCIe device based on the hardware fault recovery success information. The fault processing apparatus determines, based on the hardware fault recovery success information, a VM id of a virtual machine that uses the first PCIe device. Further, the fault processing apparatus may send notification information to the virtual machine corresponding to the VM id. The notification information is used to indicate that the virtual machine is to restart to recover the software service related to the first PCIe device. When the first PCIe device is a parallel processor, the fault processing apparatus may send, based on the fault recovery success information, second notification information to each virtual machine related to the first PCIe device. The second notification information is used to indicate that the virtual machine is to restart to recover a data processing service related to the first PCIe device. When the first PCIe device is a network adapter, the fault processing apparatus may send, based on the fault recovery success information, fourth notification information to each virtual machine related to the first PCIe device. The fourth notification information is used to indicate that the virtual machine is to restart to recover a data exchange service related to the first PCIe device.

After receiving the hardware fault recovery failure information, the fault processing apparatus may determine that the fault recovery on the first PCIe link fails. The hardware fault recovery failure information also carries the device identifier of the first PCIe device. Further, the fault processing apparatus may reset, based on the hardware fault recovery failure information, each PCIe device in the PCIe bus system in which the first PCIe device is located, to recover the first PCIe link. For example, referring to FIG. 2, after the fault processing apparatus receives the hardware fault recovery failure information, the fault processing apparatus may directly restart and reset the computing device shown in FIG. 2.

In an optional embodiment, after receiving the first hardware fault information, the fault processing apparatus may send fifth notification information to a cloud management platform. The fifth notification information is used to indicate that the cloud management platform is to temporarily stop managing at least one related virtual machine that uses the first PCIe device, for example, temporarily stop operation and maintenance performed by the cloud management platform on these virtual machines, or avoid performing direct communication with the first PCIe device or allocating the first PCIe device to a newly created virtual machine when the virtual machine is created.

Optionally, after the fault processing apparatus receives the hardware fault recovery success information, in other words, determines that the fault recovery on the first PCIe device or the first PCIe link succeeds, the fault processing apparatus may send a sixth notification message to the cloud management platform. The sixth notification message is used to indicate that the cloud management platform is to recover the management on the at least one related virtual machine that uses the first PCIe device, for example, recover the operation and maintenance performed by the cloud management platform on these virtual machines. On the contrary, after receiving the hardware fault recovery failure information, in other words, determining that the fault recovery on the first PCIe device or the first PCIe link fails, the fault processing apparatus may send a seventh notification message to the cloud management platform. The seventh notification message is used to indicate that the cloud management platform is to stop managing the at least one related virtual machine that uses the first PCIe device, for example, stop performing life cycle management and operation and maintenance on these virtual machines.

According to this embodiment of the present invention, service interruption, a problem that normal service communication cannot be provided, and the like in the prior art can be resolved, thereby ensuring service communication reliability.

Figure 5:
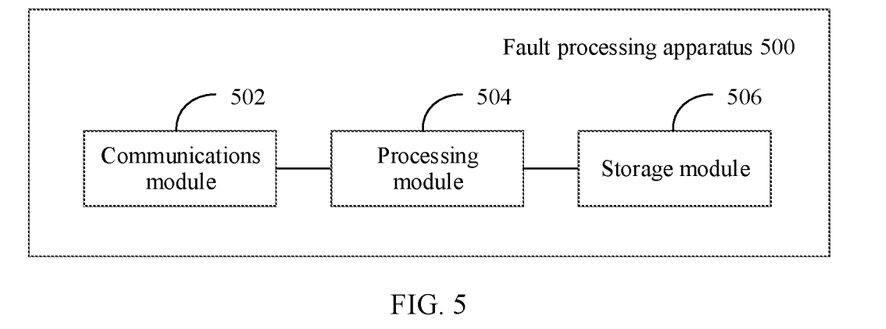
FIG. 5 is a schematic structural diagram of a fault processing apparatus according to an embodiment of the present invention.

With reference to the related descriptions in the embodiments shown in FIG. 1 to FIG. 4, the following describes a related apparatus and device to which the present invention is applicable. FIG. 5 is a schematic structural diagram of a fault processing apparatus according to an embodiment of the present invention. A fault processing apparatus 500 shown in FIG. 5 includes a communications module 502 and a processing module 504.

The communications module 502 is configured to receive first hardware fault information generated by a first PCIe device on a first high-speed serial computer expansion bus standard PCIe link. The first hardware fault information is used to indicate that a hardware fault occurs on the PCIe device, and the first hardware fault information includes a device identifier of the first PCIe device.

The processing module 504 is configured to perform, based on the first hardware fault information, fault recovery on the first PCIe link on which the first PCIe device is located, and interrupt a software service related to the first PCIe device.

Optionally, the fault processing apparatus may further include a storage module 506. The storage module 506 is configured to store program code and data related to the fault processing apparatus 500, for example, store program code for fault processing. The communications module 502 and the processing module 504 may be configured to invoke the program code in the storage module 506 to implement corresponding implementation steps. This is not limited in the present invention.

In some embodiments, the processing module 504 is configured to: when interrupting the software service related to the first PCIe device, skip interrupting a software service related to a second PCIe device. The second PCIe device is located on a second PCIe link that is in a PCIe bus system and that is different from the first PCIe link.

In some embodiments, after the processing module 504 is configured to perform, based on the first hardware fault information, fault recovery on the first PCIe link on which the first PCIe device is located, and interrupt the software service related to the first PCIe device, the communications module 502 is further configured to receive hardware fault recovery success information that is sent by a root complex and that carries the device identifier of the first PCIe device; and the processing module 504 is further configured to recover the software service related to the first PCIe device based on the fault recovery success information.

In some embodiments, before the processing module 504 is configured to perform, based on the first hardware fault information, fault recovery on the first PCIe link on which the first PCIe device is located, and interrupt the software service related to the first PCIe device, the processing module 504 is further configured to determine, based on the device identifier of the first PCIe device that is carried in the first hardware fault information, that the first PCIe device is a parallel processor.

In some embodiments, the storage module 506 records a correspondence between the device identifier of the first PCIe device and a virtual machine identifier of a virtual machine that uses the first PCIe device. That the processing module 504 is configured to interrupt a software service related to the first PCIe device includes: the processing module 504 is configured to determine, based on the correspondence and the device identifier of the first PCIe device, the virtual machine identifier (VM id) of the virtual machine that uses the PCIe device; and the communications module 502 is further configured to send, based on the virtual machine identifier, a first notification message to the virtual machine that uses the first PCIe device. The first notification message is used to indicate that the virtual machine that uses the first PCIe device is to stop using a data processing service related to the first PCIe device.

In some embodiments, that the processing module 504 is further configured to recover the software service related to the first PCIe device based on the fault recovery success information includes: the processing module 504 is configured to determine, based on the correspondence and the device identifier of the first PCIe device that is carried in the fault recovery success information, the virtual machine identifier of the virtual machine that uses the first PCIe device; and the communications module 502 is further configured to send a second notification message based on the virtual machine identifier. The second notification message is used to indicate that the virtual machine that uses the first PCIe device is to restart to recover the data processing service related to the first PCIe device.

In some embodiments, before the communications module 502 is configured to receive the first hardware fault information generated by the first PCIe device on the first high-speed serial computer expansion bus standard PCIe link, the processing module 504 is further configured to record status information stored in a register of each PCIe device on the first PCIe link. That the processing module 504 is configured to perform, based on the first hardware fault information, fault recovery on the first PCIe link on which the first PCIe device is located includes: the processing module 504 is configured to: disable a fault reporting function of each PCIe device on the first PCIe link, to stop generating a hardware fault interrupt signal, where the hardware fault interrupt signal is used to generate the first hardware fault information; reset a downstream port of each PCIe device on the first PCIe link, so that the register is recovered to an initial state; write the status information into the register; and enable the fault reporting function of each PCIe device on the first PCIe link.

In some embodiments, before the processing module 504 is configured to perform, based on the first hardware fault information, fault recovery on the first PCIe link on which the first PCIe device is located, and interrupt the software service related to the first PCIe device, the processing module 504 is further configured to determine, based on the device identifier of the first PCIe device that is carried in the first hardware fault information, that the first PCIe device is a network adapter.

In some embodiments, the storage module 506 records a correspondence between the device identifier of the first PCIe device and a virtual machine identifier of a virtual machine that uses the first PCIe device. That the processing module 504 is configured to interrupt a software service related to the first PCIe device includes: the processing module 504 is configured to determine, based on the correspondence and the device identifier of the first PCIe device, the virtual machine identifier of the virtual machine that uses the PCIe device; and the communications module 502 is further configured to send, based on the virtual machine identifier, a third notification message to the virtual machine that uses the first PCIe device. The third notification message is used to indicate that the virtual machine that uses the first PCIe device is to stop using a data exchange service related to the first PCIe device.

In some embodiments, that the processing module 504 is further configured to recover the software service related to the first PCIe device based on the fault recovery success information includes: the processing module 504 is configured to determine, based on the correspondence and the device identifier of the first PCIe device that is carried in the fault recovery success information, the virtual machine identifier of the virtual machine that uses the first PCIe device; and the communications module 502 is further configured to send, based on the virtual machine identifier, a fourth notification message to the virtual machine that uses the first PCIe device. The fourth notification message is used to indicate that the virtual machine that uses the first PCIe device is to restart to recover the data exchange service related to the first PCIe device.

In some embodiments, that the processing module 504 is configured to perform, based on the first hardware fault information, fault recovery on the first PCIe link on which the first PCIe device is located includes: the processing module 504 is configured to: disable a fault reporting function of each PCIe device on the first PCIe link, to stop generating a hardware fault interrupt signal, where the hardware fault interrupt signal is used to generate the first hardware fault information; control a root complex to stop sending a heartbeat signal to the first PCIe device; control the root complex to perform link negotiation with the first PCIe device; when the link negotiation succeeds, control the root complex to send the heartbeat signal to the first PCIe device; and enable the fault reporting function of each PCIe device on the first PCIe link.

In some embodiments, after the processing module 504 is configured to perform, based on the first hardware fault information, fault recovery on the first PCIe link on which the first PCIe device is located, and interrupt the software service related to the first PCIe device, the communications module 502 is further configured to receive hardware fault recovery failure information that is sent by the root complex and that carries the device identifier of the first PCIe device; and the processing module 504 is further configured to reset, based on the hardware fault recovery failure information, each PCIe device in the PCIe bus system in which the first PCIe device is located.

For content that is not shown or not described in the present invention, refer to the related descriptions in the foregoing embodiments. Details are not described herein again. The computing device shown in FIG. 5 may include more or fewer components during actual application. The figure is merely an example and does not constitute a limitation. Each module or each unit shown in FIG. 5 may be implemented in a manner of software or hardware manner. When each module or each unit is implemented by using the software program, each module or each unit shown in the figure is a software module. Alternatively, when each module or each unit is implemented by using the hardware, each module or each unit shown in the figure may be implemented by a component or circuit.

For example, the processing module 504 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor/controller may implement or execute various example logical blocks, modules, and circuits described with reference to content disclosed in the present invention. The processor may alternatively be a combination of processors implementing a computing function, for example, a combination of one or more microprocessors or a combination of a DSP and a microprocessor. The communications module 502 may be a communications interface, a transceiver, a transceiver circuit, or the like. The communications interface is a general term. There may be one or more interfaces such as an interface between the communications module and the processing module and an interface between the fault processing apparatus and another device. The storage module 506 may be a memory, or another service or module configured to provide a storage function.

Figure 6:
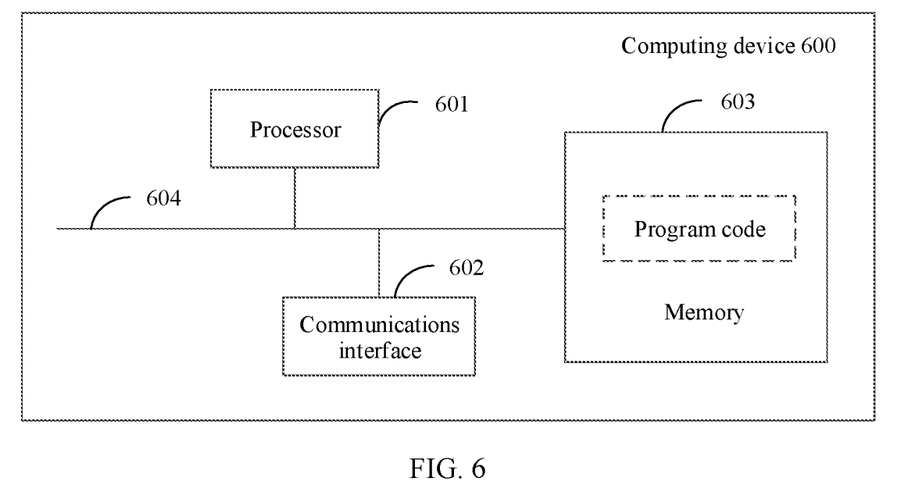
FIG. 6 is a schematic structural diagram of a computing device according to an embodiment of the present invention.

When the processing module 504 is a processor, the communications module 502 is a communications interface, and the storage module 506 is a memory, the fault processing apparatus in this embodiment of the present invention may be a fault processing apparatus (which may also be referred to as a computing device) shown in FIG. 6.

Referring to FIG. 6, a computing device 600 includes one or more processors 601, a communications interface 602, and a memory 603. The processor 601, the communications interface 602, and the memory 603 may be connected through a bus or in another manner. In this embodiment of the present invention, an example in which the processor 601, the communications interface 602, and the memory 603 are connected through a bus 604 is used.

The processor 601 may include one or more general purpose processors such as a central processing unit (CPU). The processor 601 may be configured to run a program of any one or more of the following function modules in related program code: a communications module, a processing module, a storage module, and the like. In other words, the processor 601 may implement any one or more functions of function modules such as the communications module and the processing module by executing the program code. For details about the communications module and the processing module, refer to the related descriptions in the foregoing embodiment.

The communications interface 602 may be a wired interface (for example, an Ethernet interface) or a wireless interface (for example, a cellular network interface or a wireless local area network interface), and is configured to communicate with another module/device. For example, the communications interface 602 in this embodiment of the present invention may be specifically configured to send frame data to another device.

The memory 603 may include a volatile memory, for example, a random access memory (RAM). The memory may alternatively include a nonvolatile memory, for example, a read-only memory (ROM), a flash memory, a hard disk drive (HDD), or a solid-state drive (SSD). Alternatively, the memory 603 may include a combination of the foregoing types of memories. The memory 603 may be configured to store a group of program code, so that the processor 601 invokes the program code stored in the memory 603 to implement functions of the communications module and/or the processing module in this embodiment of the present invention.

It should be noted that FIG. 6 is merely a possible implementation of this embodiment of this application. During actual application, the fault processing apparatus may further include more or fewer components. This is not limited herein. For content that is not shown or not described in this embodiment of the present invention, refer to the related descriptions in the embodiment in FIG. 4. Details are not described herein again.

An embodiment of the present invention further provides a non-transitory computer storage medium. The non-transitory computer storage medium stores an instruction, and when the instruction is run on a processor, the method procedure shown in FIG. 4 is implemented.

An embodiment of the present invention further provides a computer program product. When the computer program product is run on a processor, the method procedure shown in FIG. 4 is implemented.

Methods or algorithm steps described in combination with the content disclosed in the embodiments of the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a computing device. Certainly, the processor and the storage medium may exist in the computing device as discrete components.

A person of ordinary skill in the art may understand that all or some of the procedures of the methods in the embodiments may be implemented by a computer program indicating related hardware. The program may be stored in a computer-readable storage medium. When the program is executed, the procedures of the methods in the embodiments are performed. The foregoing storage medium includes any medium that can store program code, for example, a ROM, a RAM, a magnetic disk, or an optical disc.

What is claimed is:

1. A fault processing method comprising:
  receiving, by a fault processing apparatus, first hardware fault information generated by a first peripheral component interconnect express (PCIe) device on a first high-speed serial computer expansion bus standard PCIe link,
    wherein the first hardware fault information indicates that a hardware fault has occurred on the first PCIe device, and
    wherein the first hardware fault information comprises a device identifier of the first PCIe device;
  distinguishing, by the fault processing apparatus, between whether the first PCIe device is a parallel processor, whether the first PCIe device is a network adapter, and whether the first PCIe device is another device,
    wherein determining the first PCIe device is a network adapter is based on a fault recovery function being pre-registered with the first PCIe device; and
  performing, by the fault processing apparatus based on the first hardware fault information and based on whether the first PCIe device is a parallel processor, a network adapter, or another device, fault recovery on the first PCIe link on which the first PCIe device is located, and interrupting a software service related to the first PCIe device.

2. The method according to claim 1, wherein the software service related to the first PCIe device is interrupted without interrupting a software service related to a second PCIe device, wherein the second PCIe device is located on a second PCIe link different from the first PCIe link.

3. The method according to claim 1, wherein after performing fault recovery on the first PCIe link and interrupting the software service related to the first PCIe device, the method further comprises:
  obtaining, by the fault processing apparatus, hardware fault recovery success information that carries the device identifier of the first PCIe device; and
  recovering, by the fault processing apparatus, the software service related to the first PCIe device based on the fault recovery success information.

4. The method according to claim 3, wherein the first PCIe device is determined to be a parallel processor based on the device identifier of the first PCIe device that is carried in the first hardware fault information.

5. The method according to claim 4, wherein the fault processing apparatus records a correspondence between the device identifier of the first PCIe device and a virtual machine identifier of a virtual machine that uses the first PCIe device, and wherein interrupting the software service related to the first PCIe device comprises:

determining, by the fault processing apparatus based on the correspondence and the device identifier of the first PCIe device, the virtual machine identifier of the virtual machine that uses the first PCIe device; and sending, by the fault processing apparatus based on the virtual machine identifier, a notification message to the virtual machine that uses the first PCIe device, wherein the notification message indicates that the virtual machine is to stop running a data processing service related to the first PCIe device.

6. The method according to claim 4, wherein recovering the software service related to the first PCIe device based on the fault recovery success information comprises:

determining, by the fault processing apparatus based on the device identifier of the first PCIe device that is carried in the fault recovery success information, a virtual machine identifier of a virtual machine that uses the first PCIe device; and sending, by the fault processing apparatus based on the virtual machine identifier, a notification message to the virtual machine that uses the first PCIe device, wherein the notification message indicates that the virtual machine that uses the first PCIe device is to restart to recover a data processing service related to the first PCIe device.

7. The method according to claim 4, wherein before receiving the first hardware fault information, the method further comprises:

recording, by the fault processing apparatus, status information stored in a register of each PCIe device on the first PCIe link; and wherein performing fault recovery on the first PCIe link comprises:

disabling, by the fault processing apparatus, a fault reporting function of each PCIe device on the first PCIe link, to stop generating a hardware fault interrupt signal;

resetting, by the fault processing apparatus, a downstream port of each PCIe device on the first PCIe link, so that the register of each PCIe device on the first PCIe link is recovered to an initial state;

writing, by the fault processing apparatus, the status information into the register of each PCIe device on the first PCIe link; and enabling, by the fault processing apparatus, the fault reporting function of each PCIe device on the first PCIe link.

8. The method according to claim 3, wherein the first PCIe device is determined to be a network adapter based on the device identifier of the first PCIe device that is carried in the first hardware fault information.

9. The method according to claim 8, wherein the fault processing apparatus records a correspondence between the device identifier of the first PCIe device and a virtual machine identifier of a virtual machine that uses the first PCIe device, and wherein interrupting the software service related to the first PCIe device comprises:

determining, by the fault processing apparatus based on the correspondence and the device identifier of the first PCIe device, the virtual machine identifier of the virtual machine that uses the first PCIe device; and sending, by the fault processing apparatus, a notification message based on the virtual machine identifier, wherein the notification message indicates that the virtual machine is to stop running a data exchange service related to the first PCIe device.

10. The method according to claim 8, wherein recovering the software service related to the first PCIe device based on the fault recovery success information comprises:

determining, by the fault processing apparatus based on the device identifier of the first PCIe device that is carried in the fault recovery success information, a virtual machine identifier of a virtual machine that uses the first PCIe device; and sending, by the fault processing apparatus, a notification message to the virtual machine based on the virtual machine identifier, wherein the notification message indicates that the virtual machine is to restart to recover the data exchange service related to the first PCIe device.

11. A computing device comprising:

a processor;

a memory;

a communications interface; and a bus;

wherein the processor, the communications interface, and the memory communicate with each other through the bus;

wherein the communications interface is configured to receive and send data;

wherein the memory is configured to store processor-executable instructions; and wherein the processor is configured to execute the processor-executable instructions to facilitate the following being performed by the computing device:

receiving first hardware fault information generated by a first peripheral component interconnect express (PCIe) device on a first high-speed serial computer expansion bus standard PCIe link, wherein the first hardware fault information indicates that a hardware fault has occurred on the first PCIe device, and the first hardware fault information comprises a device identifier of the first PCIe device;

distinguishing between whether the first PCIe device is a parallel processor, whether the first PCIe device is a network adapter, and whether the first PCIe device is another device, wherein determining the first PCIe device is a network adapter is based on a fault recovery function being pre-registered with the first PCIe device; and performing, based on the first hardware fault information and based on whether the first PCIe device is a parallel processor, a network adapter, or another device, fault recovery on the first PCIe link on which the first PCIe device is located, and interrupting a software service related to the first PCIe device.

12. The computing device according to claim 11, wherein the processor is further configured to execute the processor-executable instructions to facilitate the following being performed by the computing device:

interrupting a software service related to the first PCIe device without interrupting a software service related to a second PCIe device, wherein the second PCIe device is located on a second PCIe link that is different from the first PCIe link.

13. The computing device according to claim 11, wherein the processor is further configured to execute the processor-executable instructions to facilitate the following being performed by the computing device:

obtaining hardware fault recovery success information that carries the device identifier of the first PCIe device; and recovering the software service related to the first PCIe device based on the fault recovery success information.

14. The computing device according to claim 13, wherein the first PCIe device is determined to be a parallel processor based on the device identifier of the first PCIe device that is carried in the first hardware fault information.

15. The computing device according to claim 14, wherein interrupting the software service related to the first PCIe device comprises:

determining, based on a correspondence between the device identifier of the first PCIe device and a virtual machine identifier of a virtual machine that uses the first PCIe device, the virtual machine identifier of the virtual machine that uses the first PCIe device; and sending, based on the virtual machine identifier, a notification message to the virtual machine that uses the first PCIe device, wherein the notification message indicates that the virtual machine is to stop running a data processing service related to the first PCIe device.

16. The computing device according to claim 14, wherein recovering the software service related to the first PCIe device based on the fault recovery success information comprises:

determining, based on the device identifier of the first PCIe device that is carried in the fault recovery success information, a virtual machine identifier of the virtual machine that uses the first PCIe device; and sending, based on the virtual machine identifier, a notification message to the virtual machine that uses the first PCIe device, wherein the notification message indicates that the virtual machine is to restart to recover the data processing service related to the first PCIe device.

17. The computing device according to claim 14, wherein the processor is further configured to execute the processor-executable instructions to facilitate the following being performed by the computing device:

recording status information stored in a register of each PCIe device on the first PCIe link; and wherein performing fault recovery on the first PCIe link comprises:

disabling a fault reporting function of each PCIe device on the first PCIe link, to stop generating a hardware fault interrupt signal;

resetting a downstream port of each PCIe device on the first PCIe link, so that the register of each PCIe device on the first PCIe link is recovered to an initial state;

writing the status information into the register of each PCIe device on the first PCIe link; and enabling the fault reporting function of each PCIe device on the first PCIe link.

18. The computing device according to claim 13, wherein the first PCIe device is determined to be a network adapter based on the device identifier of the first PCIe device that is carried in the first hardware fault information.

19. The computing device according to claim 18, wherein interrupting the software service related to the first PCIe device comprises:

determining, based on a correspondence between the device identifier of the first PCIe device and a virtual machine identifier of a virtual machine that uses the first PCIe device, the virtual machine that uses the PCIe device; and sending a notification message based on the virtual machine identifier, wherein the notification message indicates that the virtual machine is to stop running a data exchange service related to the first PCIe device.

20. The computing device according to claim 18, wherein recovering the software service related to the first PCIe device based on the fault recovery success information comprises:

determining, based on a correspondence between the device identifier of the first PCIe device and a virtual machine identifier of a virtual machine that uses the first PCIe device, the virtual machine identifier of the virtual machine that uses the first PCIe device; and sending a notification message to the virtual machine based on the virtual machine identifier, wherein the notification message indicates that the virtual machine is to restart to recover the data exchange service related to the first PCIe device.

21. A non-transitory computer readable medium configured to store processor-executable instructions that, when executed by a processor, facilitate the processor to provide at least the following operations:

receive first hardware fault information generated by a first peripheral component interconnect express (PCIe) device on a first high-speed serial computer expansion bus standard PCIe link, wherein the first hardware fault information indicates that a hardware fault has occurred on the first PCIe device, and wherein the first hardware fault information comprises a device identifier of the first PCIe device;

distinguish between whether the first PCIe device is a parallel processor, whether the first PCIe device is a network adapter, and whether the first PCIe device is another device, wherein determining the first PCIe device is a network adapter is based on a fault recovery function being pre-registered with the first PCIe device;

perform, based on the first hardware fault information and based on whether the first PCIe device is a parallel processor, a network adapter, or another device, fault recovery on the first PCIe link on which the first PCIe device is located; and interrupt a software service related to the first PCIe device.

22. The non-transitory computer readable medium according to claim 21, wherein the stored processor-executable instructions include further processor-executable instructions to facilitate the following operations by the processor:

interrupting the software service related to the first PCIe device without interrupting a software service related to a second PCIe device, wherein the second PCIe device is located on a second PCIe link that is different from the first PCIe link.

* * * * *

UNITED STATES PATENT AND TRADEMARK OFFICE
CERTIFICATE OF CORRECTION

Page 1 of 1

PATENT NO. : 11,994,940 B2
APPLICATION NO. : 17/384361
DATED : May 28, 2024
INVENTOR(S) : Liu et al.

It is certified that error appears in the above-identified patent and that said Letters Patent is hereby corrected as shown below:

On the Title Page

Item (71) Applicant: "Huawei Cloud Computing Technologies Co., Ltd., Shenzhen (CN)" should read -- Huawei Cloud Computing Technologies Co., Ltd., Gui'an New District (CN) --.

Page 2: item (56) References Cited, Foreign Patent Documents, Right-Hand Column, Line 10: "IN 104170322 A 11/2014" should read -- CN 104170322 A 11/2014 --.

Signed and Sealed this
Eighth Day of April, 2025

Coke Morgan Stewart
*Acting Director of the United States Patent and Trademark Office*